United States Patent [19]

Maeda

[11] Patent Number: 4,914,646

[45] Date of Patent: Apr. 3, 1990

[54] OPTICAL PICKUP DEVICE HAVING PARTICULARLY SHAPED PHOTODETECTORS FOR PROVIDING AN ACCURATE FOCUS ERROR

[75] Inventor: Takanori Maeda, Saitama, Japan

[73] Assignee: Pioneer Electric Corporation, Tokyo, Japan

[21] Appl. No.: 177,734

[22] Filed: Apr. 5, 1988

[30] Foreign Application Priority Data

May 22, 1987 [JP] Japan .................... 62-125321

[51] Int. Cl.$^4$ ............................................. G11B 7/00
[52] U.S. Cl. ................................................. 369/45
[58] Field of Search ................ 250/201 DF; 369/44, 369/45, 46, 118

[56] References Cited

U.S. PATENT DOCUMENTS

| | | | |
|---|---|---|---|
| 4,152,586 | 5/1979 | Elliot et al. | 369/45 |
| 4,366,377 | 12/1982 | Notthoff et al. | 369/46 |
| 4,525,826 | 6/1985 | Nakamura et al. | 369/46 |
| 4,585,933 | 4/1986 | Ando | 369/45 |
| 4,633,454 | 12/1986 | Tsukai | 369/45 |
| 4,654,838 | 3/1987 | Sugiki | 369/46 |
| 4,684,799 | 8/1987 | Emoto et al. | 369/45 |
| 4,695,158 | 9/1987 | Kotaka | 369/45 |
| 4,816,665 | 3/1989 | Hsu | 369/45 |

FOREIGN PATENT DOCUMENTS

| | | |
|---|---|---|
| 60-138748 | 7/1985 | Japan . |
| 61-24037 | 2/1986 | Japan . |
| 61-214143 | 9/1986 | Japan . |

*Primary Examiner*—Donald McElheny, Jr.
*Attorney, Agent, or Firm*—Sughrue, Mion, Zinn, Macpeak & Seas

[57] ABSTRACT

An optical pickup device for supplying a correct focus error signal. The optical pickup device includes a light source for generating a light beam; a recording medium for receiving and reflecting the light beam; and a photo-detector for receiving the reflected light beam from the recording medium and for outputting a focus error signal of the light beam. The photo-detector is divided into at least two regions and includes a reference portion within the at least two regions. When the light beam received by the photo-detector is not within the reference portion of the photo-detector, a portion of the light beam is not detected by at least one of the at least two regions, thereby supplying a correct focus error signal.

10 Claims, 3 Drawing Sheets

OPTICAL PICKUP DEVICE HAVING PARTICULARLY SHAPED PHOTODETECTORS FOR PROVIDING AN ACCURATE FOCUS ERROR

FIELD OF THE INVENTION

The present invention relates to an optical pickup device suitable for use with optical disk devices, compact disk players, optical video disk players and the like.

BACKGROUND OF THE INVENTION

FIG. 1 shows the arrangement of a conventional optical pickup device which includes a light source (e.g. a semiconductor laser) 1, a parallel planar plate 2, an objective lens 3, a recording medium (e.g. an optical disk) 4, and a photo-detector 5. As shown by the arrows of FIG. 1, a divergent light beam is emitted from the light source 1 to the surface of the parallel planar plate 2 where the light beam is reflected to the objective lens 3. The objective lens 3 serves to focus the reflected light beam onto the optical disk 4.

The focused light beam on disk 4 is then reflected to the photo-detector 5 through the objective lens 3 and the parallel planar plate 2. Since the parallel planar plate 2 consists of a glass plate or the like, and since plate 2 is disposed in the light beam converging path between the objective lens 3 and the photo-detector 5, the light beam received by the photo-detector 5 necessarily suffers from astigmatism.

FIGS. 2(a)-(e) show the photo-detector 5 of FIG. 1, wherein the photo-detector is divided into four regions $D_1$-$D_4$ by a first straight line 51, and a second straight line 52 which is perpendicular to the first straight lie 51. When the light beam from the objective lens is correctly focused into the disk 4, a so-called "focus state" is achieved. More particularly, in the focus state, a substantially circular light spot is formed on the photo-detector 5 as shown in FIG. 2(a). However, when the disk 4 is moved towards or away from the lens 3, a substantially elliptical light spot is formed on the photo-detector as shown in FIGS. 2(b) and 2(c). Therefore, according to the principle of astigmatism, a focus error signal having a characteristic as indicated by the curve a in FIG. 3 can be obtained. The focus error (FE) signal associated with the light spots of the conventional pickup device can be detected from the output of the photo-detector 5. More particularly, the focus error signal is equal to the difference between the sum of the outputs of regions $D_1$ and $D_3$ and the sum of the outputs of regions $D_2$ and $D_4$. Curve a of FIG. 3 shows the focus error signal of the light spots of FIGS. 2(a), 2(b), and 2(c), wherein the minimum point of curve a is the focus error of FIG. 2(b), the origin is the focus error of FIG. 2(a) (i.e. no focus error), and the maximum point of signal a is the focus error of FIG. 2(c). In addition to detecting the focus error signal, the photo-detector 5 can detect variations in the level of the reflected light beam from beam 4 (which is modulated with signals (pits) recorded on the disk) from the sum of the outputs of regions $D_1$-$D_4$ of photo-detector 5.

A problem occurs with the detection of the focus error signal of the pickup device of FIG. 1 when the optical components of the pickup device are not properly positioned, or when the objective lens 3 is moved in a tracking direction. More particularly, in either of these situations, the light spot reflected onto the photo-detector 5 from the disk 4 will be shifted from the center of the photo-detector 5 (FIG. 2(a)) to, for example, the position shown in FIG. 2(d). As a result, the focus error signal becomes offset (from the origin) as shown by curve b of FIG. 3. In addition, the situation may arise where the objective lens is moved such that the light spot has the shape and position as shown in FIG. 2(e). Although the light spot of FIG. 2(e) has a zero focus error signal, it is not in the focus state. As a result, the degree of modulation of the light beam by the signals (pits) recorded on the disk 4 is lowered, thereby causing the pickup device to be sensitive to noise.

Thus, there is a continuing need in the art for a pickup device which can provide a correct focus error signal even when the light beam applied to the photo-detector is somewhat shifted from a predetermined reference position on the photo-detector.

SUMMARY OF THE INVENTION

It is therefore an object of the present invention to provide a pickup device which can supply a correct focus error signal even when the light beam applied to the photo-detector is somewhat shifted from a predetermined reference position (e.g. center) on the photo-detector. The present invention accomplishes this and other objects by providing an optical pickup device having a light source for generating a light beam; a recording medium for receiving and reflecting the light beam; and a photo-detector for receiving the reflected light beam from the recording medium and for outputting a focus error signal of the light beam. The photo-detector is divided into at least two regions and includes a reference portion within the at least two regions. When the light beam received by the photo-detector is not within the reference portion of the photo-detector, a portion of the light beam is not detected by at least one of the at least two regions, thereby producing a correct focus error signal.

PREFERRED EMBODIMENTS OF THE INVENTION

Figure 1:
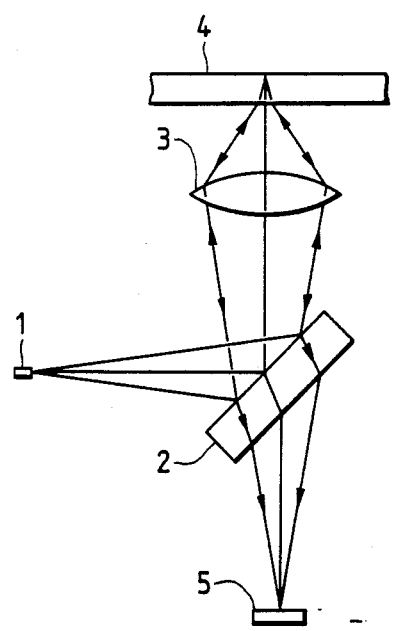
FIG. 1 is a plan view showing the arrangement of a conventional optical pickup device.
Figure 3:
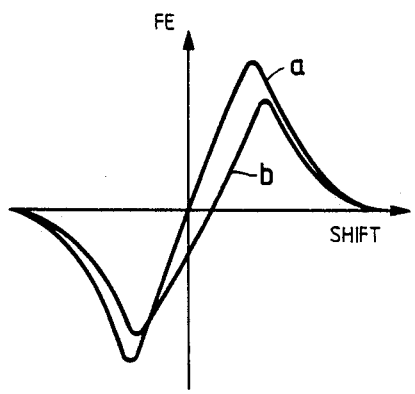
FIG. 3 is a graphical representation of the two focus error signals according to the conventional optical pickup device of FIG. 1.

The optical pickup device according to the present invention is similar to the arrangement of the conventional optical pickup device of FIG. 1; however, the present invention is quite different from the prior art device with regard to how the photo-detector 5 is divided.

Figure 4A:
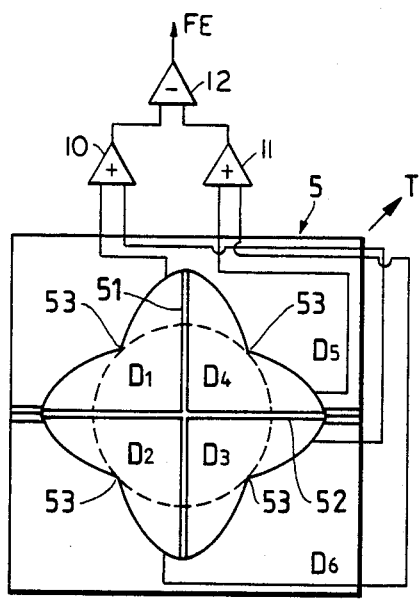
FIGS. 4(a)-(b) are plan views showing a photo-detector according to an embodiment of the present invention.
Figure 4B:
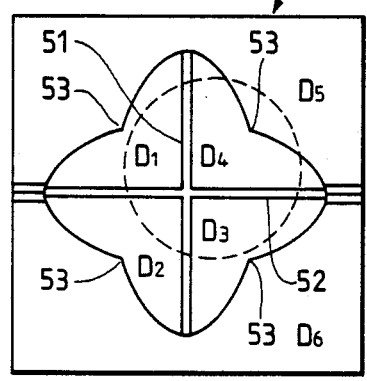
Figure 2A:
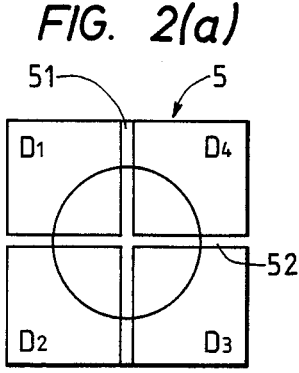
FIGS. 2(a)-(e) each show a plan view of a photo-detector in the conventional optical pickup device of FIG. 1.
Figure 2D:
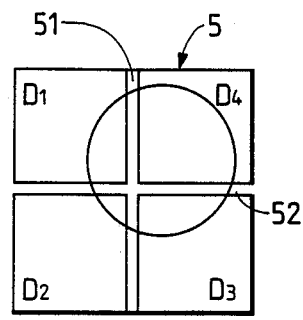
Figure 2B:
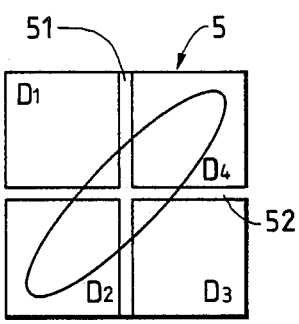
Figure 2E:
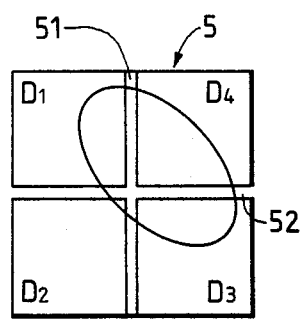
Figure 2C:
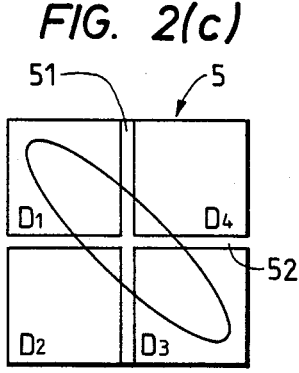

FIGS. 4(a)-(b), shows a photo-detector 5 according to the optical pickup device of the present invention. In FIGS. 4(a)-(b), the photo-detector 5 has six regions, labelled $D_1$–$D_6$. Regions $D_1$ through $D_4$ are defined by first and second division lines 51 and 52, respectively. As shown in FIG. 4a, the device includes a pair of adders 10, 11 and a subtractor 12 for determining the focus error signal as discussed above in connection with the prior art system shown in FIG. 2. Each of the regions $D_1$ through $D_4$ has a drawdown point 53 on its periphery which serves to delimit the respective regions of the photo-detector. As shown in FIGS. 4(a)–(b), each of the drawdown points is located on an imaginary line (not shown) forming a 45° angle with respect to the division lines 51 and 52. Further, each of the drawdown points is shown to be tangent to the circumference of a focused light spot which is positioned at the center of the photo-detector 5 as indicated by broken lines in FIGS. 4(a)–(b). Referring to FIG. 4(b), the light spot is shown to have moved a relatively short distance towards the drawdown point 53 of region $D_4$ in a tracking direction T. More particularly, a portion of the light spot has moved outside of region $D_4$ into region $D_5$. As a result, the portion of the light spot which is within region $D_5$ will not be detected by region $D_4$. Thus, although the light spot in FIG. 4(b) has moved from its initial position in FIG. 4(a), the sum of the outputs of regions $D_4$ and $D_2$ will still be equal to the sum of the outputs of regions $D_1$ and $D_3$.

Figure 5:
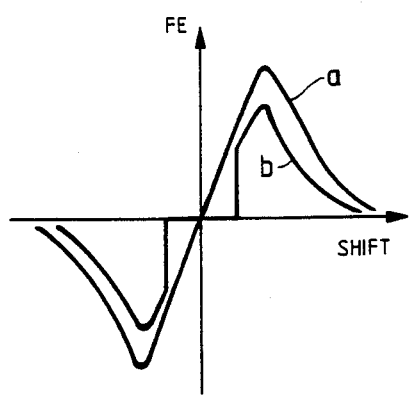
FIG. 5 is a graphical representation of two focus error signals according to the present invention.

Referring now to FIG. 5, wherein curve a represents the focus error signal of the light spot centered as in FIG. 4(a), and curve b represents the focus error signal of the light spot off center as in FIG. 4(b). As shown in the curve b of FIG. 5, even when the light spot is shifted in a tracking direction T, the focus error signal does not become offset. It should be understood that the selection of the tracking direction T is arbitrary, and that the invention provides the same effect (i.e. the resulting focus error signal is not shifted) when the light spot is moved in tracking directions other than T. However, when the light spot is moved in a direction which is parallel with either of the two division lines 51 or 52, the focus error signal will have no offset, even without the drawdown points 53 of the invention. Thus, according to the invention, the focus error signal will have no offset in any selected tracking direction. More particularly, the invention provides an accurate focus error signal even when the light spot on the photo-detector is moved in a selected tracking direction.

In the embodiment of FIGS. 4(a)–(b), it was assumed that the light spot was circular; however, those skilled in the art will understand that, in practice, the configuration of the drawdown points 53 will be determined according to the aberration and the distribution of intensity of the light beam.

Although the photo-detector of FIGS. 4(a)–(b) provides a correct focus error signal, the sum of the outputs of regions $D_1$ through $D_4$ of FIG. 4(b) is less than that the sum of the outputs of the regions $D_1$ through $D_4$ of FIG. 4(a). Thus, although a correct focus error signal is detected when the light is moved as shown in FIG. 4(b), a correct reproduction signal (RF signal) of the light spot will not be obtained.

For the purposes of obtaining a correct reproduction signal, the present invention provides two additional regions. More particularly, photo-detector 5 includes region $D_5$ which is formed outside of regions $D_1$ and $D_4$, and region $D_6$ which is formed outside of regions $D_2$ and $D_3$. As a result, a correct reproduction signal can be detected by simply calculating the sum of the outputs of regions $D_1$ through $D_6$.

Figure 6:
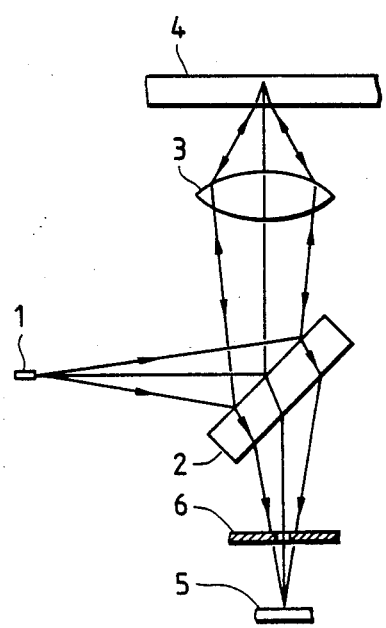
FIG. 6 is an plan view showing an embodiment of the optical pickup device of the present invention.

Referring now to FIG. 6, where there is shown another embodiment of the present invention. In this embodiment, the photo-detector 5 is divided by division lines 51 and 52 as in the embodiment of FIGS. 4(a)–(b); however, instead of drawdown points, a light shielding member 6 for intercepting a part of the light beam is included between the parallel planar plate 2 and the photo-detector 5. The light shielding member 6 performs the same function as the drawdown points in FIGS. 4(a)–(b).

Figure 7A:
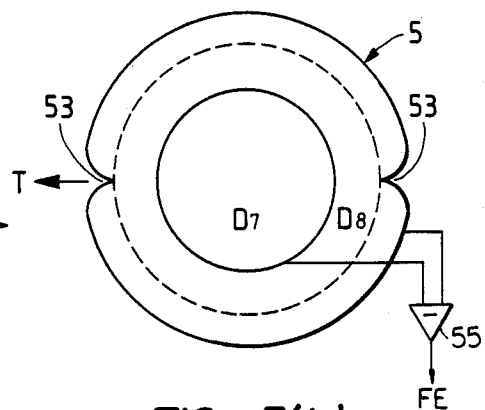
FIGS. 7(a)-(b) are plan views of a photo-detector according to an embodiment of the present invention.
Figure 7B:
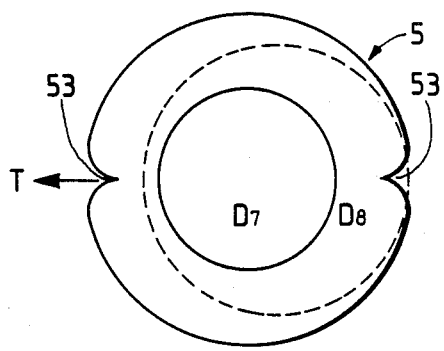

FIGS. 7 (a)–(b) shows another embodiment of the present invention. In this embodiment, photo-detector 5 is divided into two regions, namely, an inner circular region $D_7$, and an outer annular region $D_8$ having two drawdown points 53 in a tracking direction T. In FIGS. 7(a)–(b), the focus error signal is equal to the difference between the outputs of regions $D_7$ and $D_8$. Accordingly, referring to FIG. 7(a), a subtractor 55 is provided which provides the difference between regions $D_7$ and $D_8$. As shown in FIG. 7(a), when the light beam is focused onto the photo-detector 5, the difference between the outputs of regions $D_7$ and $D_8$ is zero. When the light spot is moved from its correct position shown in FIG. 7(a) towards one of the drawdown points 53 as shown in FIG. 7(b), the amount of light detected by region $D_8$ is decreased in proportion to the amount in which the light spot has moved outside of region $D_8$. In addition, the output of region $D_7$ is decreased because the energy of the light spot gradually decreases as it moves from the center of the photo-detector 5 (FIG. 7(a)) towards the outer periphery of region $D_8$ (FIG. 7(b)). Therefore, in this embodiment the drawdown points 53 are designed such that the changes in the outputs of regions $D_7$ and $D_8$ are cancelled out, thereby preventing the focus error signal from becoming offset. The photo-detector of FIGS. 7(a)–(b) may also include data detecting regions, located outside of region $D_8$, for detecting a reproduction signal as in the embodiment of FIGS. 4(a)–(b). Further, instead of drawdown points 53, the light shielding member 6 of FIG. 6 may be used.

Those skilled in the art will understand that the present invention may be implemented with strip-type optical pickup devices, two-piece type optical pickup devices, and optical pickup devices according to the so-called knife-edge method, as well as those which have been described above.

Further, while there has been described and illustrated specific embodiments of the invention, it will be clear that further variations and modifications may be made without departing from the true spirit and scope of the invention which is defined in the appended claims.

I claim:

1. In an optical pickup device of the type having a light source for generating a light beam, an objective lens for focusing said light beam, a recording medium for receiving and then reflecting the focused light beam, and photo-detector means for receiving the reflected light beam from the recording medium such that the reflected light beam falls on the photo-detector means, said photo-detector means comprising a plurality of separate regions, a logical combination of the outputs from said separate regions providing an indication of an out of focus condition of the reflected light beam falling on said photo-detector means, the improvement comprising, said photo-detector means having a shape such that the logical combination of the outputs from said separate regions indicates an out of focus condition only if a part of the reflected light beam falls outside of the photo-detector means.

2. The device according to claim 1, further comprising a light shielding member positioned between the recording medium and said photo-detector means for intercepting a portion of the light beam.

3. In an optical pickup device of the type having a light source for generating a light beam, an objective lens for focusing said light beam, a recording medium for receiving and then reflecting the focused light beam, and photo-detector means for receiving the reflected light beam from the recording medium such that the reflected light beam falls on the photo-detector means, said photo-detector means comprising a plurality of separate regions, a logical combination of the outputs from said separate regions providing an indication of an out of focus condition of the reflected light beam falling on said photo-detector means.

the improvement comprising, said photo-detector means being divided into four separate photo-detector regions by a pair of perpendicular division lines intersecting at a common point, and wherein a radius from the common point to an outer edge of each of said four separated photo-detector regions varies, the radius being a minimum when it forms a 45° angle to the division lines, and being a maximum when it is perpendicular to one of the division lines.

4. The pickup device according to claim 3, further comprising a first data detecting region located outside of the first and fourth photo-detector regions, and a second data-detecting region located outside of the second and third photo-detector regions.

5. The pickup device according to claim 4, wherein a reproduction signal of the light beam is calculated by the sum of the outputs of the first, second, third, and fourth photo-detector regions, and the first and second data-detecting regions.

6. The pickup device according to claim 3, wherein the focus error signal is calculated by the difference between the sum of the outputs of the first and the third photo-detector regions and the sum of the outputs of the second and fourth photo-detector regions.

7. In an optical pickup device of the type having a light source for generating a light beam an objective lens for focusing said light beam a recording medium for receiving and then reflecting the focused light beam and photo-detector means for receiving the reflected light beam from the recording medium such that a light spot falls on the photo-detector means, said photo-detector means comprising a plurality of separate regions, a logical combination of the outputs from the separate regions providing an indication of an out of focus condition of the light spot falling on said photo-detector means, the improvement comprising said photo-detector means being divided into two regions by an inner circular region, and an outer annular region, said outer annular region having two drawdown points on its circumference such that a distance between each of the drawdown points and a center point of said inner circular region is less than a distance between any point on the circumference of said outer annular region which is not at the drawdown points and the center point of said inner circular region.

8. The device according to claim 7, wherein the light focus error signal is detected by calculating the difference between the outputs of said inner circular region and said outer annular region.

9. The device according to claim 8, further comprising a data-detecting region located outside of said annular region.

10. The device according to claim 9, wherein a reproduction signal of the light beam is detected by calculating the sum of the outputs of said inner circular region, said outer annular region, and said data detecting region.

* * * * *